H. B. MASON.
EXTENSION RUNNING BOARD FOR AUTOMOBILES.
APPLICATION FILED APR. 9, 1915.
1,206,571. Patented Nov. 28, 1916.
2 SHEETS—SHEET 1.
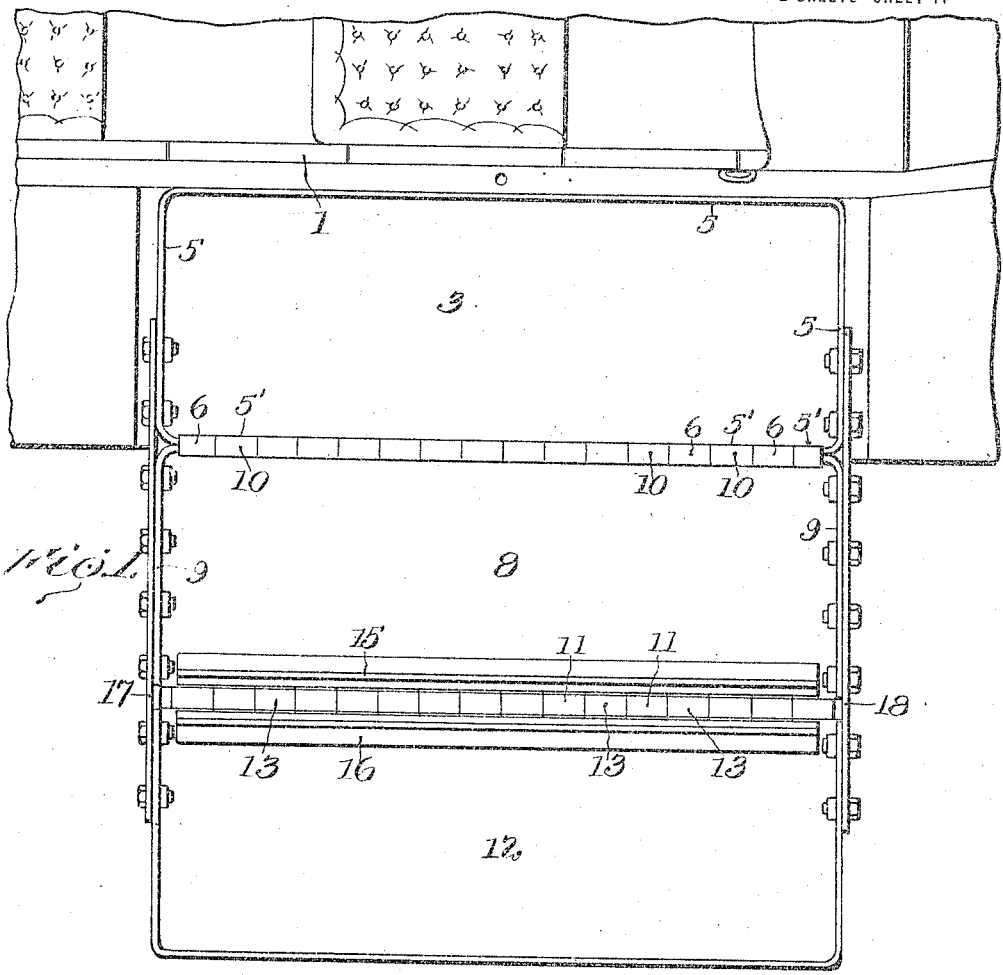
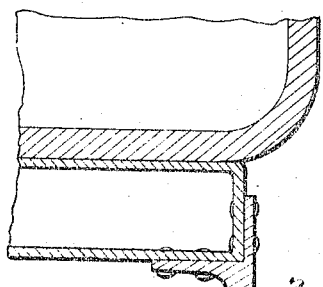

H. B. MASON.
EXTENSION RUNNING BOARD FOR AUTOMOBILES.
APPLICATION FILED APR. 9, 1915.

1,206,571. Patented Nov. 28, 1916.
2 SHEETS—SHEET 2.

Witnesses

Inventor
H. B. Mason
By Sturtevant & Mason
Attorney

UNITED STATES PATENT OFFICE.

HUGH B. MASON, OF SAN BERNARDINO, CALIFORNIA, ASSIGNOR OF ONE-HALF TO BYRON GAY, OF SAN BERNARDINO, CALIFORNIA.

EXTENSION RUNNING-BOARD FOR AUTOMOBILES.

1,206,571.   Specification of Letters Patent.   Patented Nov. 28, 1916.

Application filed April 9, 1915. Serial No. 20,195.

*To all whom it may concern:*

Be it known that I, HUGH B. MASON, a citizen of the United States, residing at San Bernardino, in the county of San Bernardino, State of California, have invented certain new and useful Improvements in Extension Running-Boards for Automobiles, of which the following is a description, reference being had to the accompanying drawing, and to the figures of reference marked thereon.

My invention relates to new and useful improvements in an extension running board for automobiles.

The object of my invention is to provide an extension running board which can be extended in a horizontal position to form a bed or table, or can be so folded as to form a pocket or luggage carrier on each side of the automobile between the forward and rear fenders.

Another object of my invention is to provide an extension running board of this character which can be readily fastened to the usual running board brackets and thus requires no alteration of the automobile to which the board is attached.

A still further object of my invention is to provide a simple, cheap and efficient stamped sheet metal extension running board having certain details of structure and combination of parts hereinafter more fully described.

Figure 3:
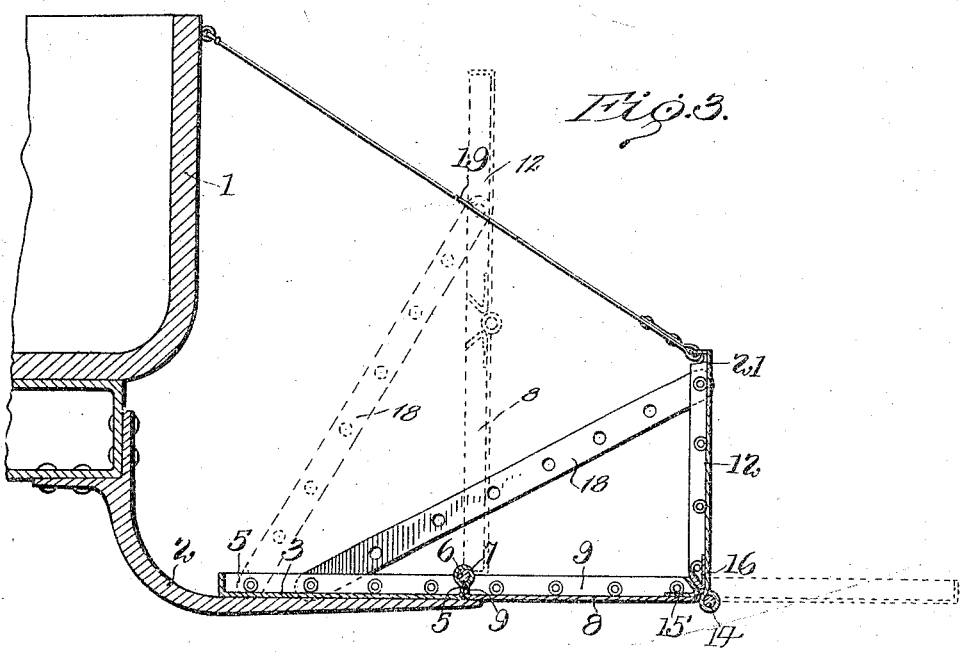
Figure 4:
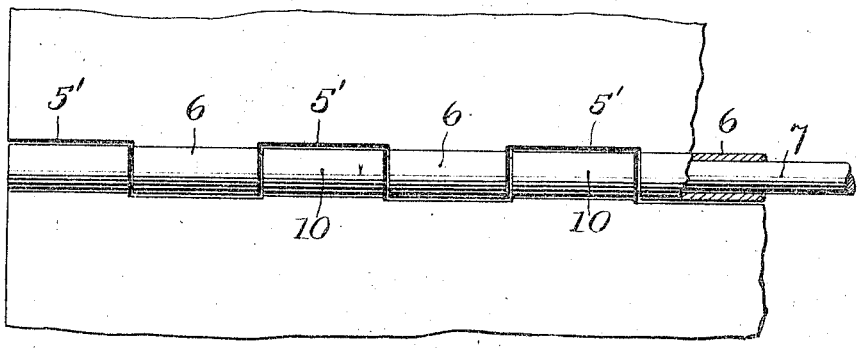

In the drawings, Figure 1 is a top plan view of one side of an automobile, showing my improved running board in its extended position; Fig. 2 is a transverse sectional view, showing the running board in its folded position and showing the securing means therefor; Fig. 3 is a transverse sectional view, similar to Fig. 2, showing the sections in full lines in their extended position when used as a bed or table, and showing the outer sections in dotted lines when used as a luggage carrier; and Fig. 4 is an enlarged plan view showing the hinged connection between the stamped sheet metal sections.

Referring now to the drawings, 1 represents an automobile which is provided with the usual running board supporting brackets 2, secured to the automobile in the usual manner and to which my improved extension running board is attached.

My improved running board consists of the section 3 made of stamped sheet metal and riveted or bolted to the brackets 2. This section is provided with an upwardly extending flange 5 entirely surrounding the same. The outer edge of the flange 5 is provided with cut-away portions 5', and between the said cut-away portion the flange is formed into bearings 6 through which the rod 7 passes. The second section 8 has its flange 9 at its inner edge provided with cut-away portions and bearings 10 which pass into the cut-away portion 5 of the section 3 and through which the rod 7 passes for pivotally connecting the two sections.

The flanges 5 and 9 of the sections 3 and 8 abut and prevent the section 8 from passing downwardly beyond a horizontal alinement with the section 8. The outer edge of the section 8 is provided with cut-away portions and the metal between the cut-away portions is rolled to form bearings 11. The outermost section 12 has its inner edge cut-away and the portion between the cut-away portions rolled to form bearings 13, and passing through these bearings and also the bearing 11, in the section 8, is a rod 14, which forms the pivotal connection between the sections 8 and 12.

In order to form abutting flanges for the outer and inner edges of the sections 8 and 12, I provide the plates 15 and 16, secured to the upper faces of the sections and obliquely arranged in respect thereto. By this arrangement, it will be seen that, when the outer section 12 is swung in a vertical position, as shown in Fig. 3, the oblique walls of the plates 15 and 16 abut and the outer section 12 is prevented from moving inwardly beyond a vertical position.

The flanges of the sections at the ends are provided with openings through which bolts pass and the said bolts also pass through openings in the bars 17 and 18. These bars, as will be fully understood, hold the three sections in horizontal alinement when the running board is used as a bed or table.

When the device is used as a luggage carrier, in the positions shown in Fig. 3, the bars 17 and 18 are rigidly connected to the outer end of the outer section 12 and the inner end of the inner section 3 by bolts and hold the two outer sections in the two folded positions shown in Fig. 3; this forms a pocket the full length of the running board and is of a width equal to either the section 3 or the sections 3 and 8, for holding luggage.

In order to further brace the outer section, I provide straps 19, which pass through openings 21 in the flange at the edge of the section 12, and which are secured to the body of the automobile, as shown in Fig. 3.

When the sections are in their folded position, the outer section 12 assumes the position shown in Fig. 2, and the space within the flange thereon is filled with wood, or other composition, 22, to form a smooth running board. Passing through the running board supporting brackets are bolts which have hooked upper ends which pass over the hinge between the sections 8 and 12 and are provided with thumb-nuts, whereby the folded running board is held firmly in position.

Having thus described my invention, what I claim as new and desire to secure by Letters Patent, is:

1. The combination with an automobile, of a running board comprising a stationary section, a series of sections hinged thereto and adapted to fold over upon the stationary section and forming the tread of the running board, and means for supporting the hinged sections in a horizontal position in alinement.

2. The combination with an automobile, of a running board comprising a stationary section, a series of sections movably connected thereto and adapted to fold over the stationary section and forming the tread of the running board, means for supporting the movable sections in a horizontal position in alinement, and means for supporting the movable section or sections in a vertical position.

3. The combination with an automobile, of a running board comprising a stationary section, a series of hinged sections folding in opposite directions, and means for supporting the sections in a horizontal position in alinement, and means for supporting the outer section or sections in a vertical position.

4. The combination with an automobile, of a running board, comprising a series of hinged sections folding in opposite directions, and a bar adapted to support the sections in a horizontal position in alinement with each other.

5. The combination with an automobile, of a running board comprising a series of hinged sections folding in opposite directions, and a bar adapted to support the sections in a horizontal or vertical position, for the purpose described.

6. The combination with an automobile, of a running board comprising a series of hinged sections folding one upon the other in opposite directions, a bar adapted to support the sections in a horizontal or vertical position for the purpose described, and straps connected to the outer section and the body of the automobile.

7. The combination with an automobile, of a running board comprising a stationary section, a series of sections hinged thereto and adapted to fold over upon the stationary section and forming the tread of the running board, means for supporting the hinged sections in a horizontal position in alinement and in alinement with the stationary section and forming a bed, and means for supporting the outer sections in a vertical position forming a luggage carrier.

8. The combination with an automobile, of a running board comprising a stationary section, a section hinged thereto and adapted to fold over upon the stationary section and forming the tread of the running board, means for supporting the hinged section in a horizontal position in alinement with the stationary section and forming a bed, and means for supporting the hinged section in a vertical position forming a luggage carrier.

9. The combination with an automobile, of a runing board comprising a stationary section and a series of movable sections normally supported in horizontal position within the side limits of the running board and in a plane parallel with the plane of the running board and capable of being moved to one side of the running board and means for supporting said movable sections in horizontal alinement.

10. The combination with an automobile, of a running board comprising a stationary section and a series of movable sections normally supported in horizontal position within the side limits of the running board, and in a plane parallel with the running board and forming the tread thereof and capable of being moved into horizontal alinement therewith, and means for supporting the movable sections in said horizontal alined position.

In testimony whereof I affix my signature in the presence of two witnesses.

HUGH B. MASON.

Witnesses:
C. A. LOTHROP,
H. B. SCOTT.